(12) United States Patent
Thiel et al.

(10) Patent No.: US 12,060,458 B2
(45) Date of Patent: Aug. 13, 2024

(54) POLYMERS OF A COMPOUND COMPRISING A MONOTHIOCARBONATE GROUP AND AN ETHYLENICALLY UNSATURATED GROUP

(71) Applicant: BASF SE, Ludwigshafen am Rhein (DE)

(72) Inventors: Indre Thiel, Ludwigshafen (DE); Markus Jegelka, Ludwigshafen (DE); Peter Rudolf, Ludwigshafen (DE)

(73) Assignee: BASF SE, Ludwigshafen am Rhein (DE)

( * ) Notice: Subject to any disclaimer, the term of this patent is extended or adjusted under 35 U.S.C. 154(b) by 636 days.

(21) Appl. No.: 17/270,187

(22) PCT Filed: Aug. 19, 2019

(86) PCT No.: PCT/EP2019/072074
§ 371 (c)(1),
(2) Date: Feb. 22, 2021

(87) PCT Pub. No.: WO2020/043517
PCT Pub. Date: Mar. 5, 2020

(65) Prior Publication Data
US 2021/0309805 A1    Oct. 7, 2021

(30) Foreign Application Priority Data

Aug. 28, 2018 (EP) .................................. 18191064

(51) Int. Cl.
*C08G 75/28* (2006.01)
*C08G 71/04* (2006.01)
*C08G 75/02* (2016.01)

(52) U.S. Cl.
CPC ............. *C08G 75/28* (2013.01); *C08G 71/04* (2013.01)

(58) Field of Classification Search
None
See application file for complete search history.

(56) References Cited

U.S. PATENT DOCUMENTS

| | | |
|---|---|---|
| 2,828,318 A | 3/1958 | Reynolds |
| 3,072,676 A | 1/1963 | Johnson et al. |
| 3,201,416 A | 8/1965 | Johnson et al. |
| 3,349,100 A | 10/1967 | Villa |
| 3,517,029 A | 6/1970 | Johnson |
| 6,372,871 B1 | 4/2002 | Jimbo et al. |
| 2007/0225452 A1 | 9/2007 | Kulshrestha et al. |
| 2020/0239633 A1 | 7/2020 | Rudolf et al. |
| 2020/0354333 A1 | 11/2020 | Rudolf et al. |
| 2021/0171811 A1 | 6/2021 | Licht et al. |
| 2021/0395454 A1 | 12/2021 | Thiel et al. |

FOREIGN PATENT DOCUMENTS

| | | |
|---|---|---|
| EP | 1506964 A1 | 2/2005 |
| EP | 2468791 A1 | 6/2012 |
| FR | 1399562 A * | 5/1965 |
| FR | 1399562 A | 5/1965 |
| JP | 07062190 A * | 3/1995 |
| JP | H07-62190 | 7/1995 |
| JP | 2007-178903 A | 7/2007 |
| JP | 2007178903 A * | 7/2007 |
| JP | 2012-232954 | 11/2012 |
| WO | WO-2011/157671 A1 | 12/2011 |
| WO | 2012/085120 | 6/2012 |
| WO | WO-2013/144299 A1 | 10/2013 |
| WO | 2018/054609 | 3/2018 |
| WO | WO-2019/034468 A1 | 2/2019 |
| WO | WO-2019/034469 A1 | 2/2019 |
| WO | WO-2019/034470 A1 | 2/2019 |
| WO | WO-2019/034473 A1 | 2/2019 |

OTHER PUBLICATIONS

Reynolds et al., "Mercaptoethylation. I. Mercaptoethylation of Amines with Ethylene Monothicarbonate," Journal of Organic Chemistry, vol. 26, pp. 5109-5110. (1961) (Year: 1961).*
International Search Report for PCT Patent Application No. PCT/EP2019/072074, Issued on Nov. 21, 2019, 3 pages.
Kihara, et al., "Preparation of 1,3-Oxathiolane-2-thiones by the Reaction of Oxirane and Carbon Disulfide", The Journal of Organic Chemistry, vol. 60, Issue 2, Jan. 1, 1995, pp. 473-475.
Reynolds, et al., "Mercaptoethylation. II. Preparation of 2-Mercaptoethyl Carbamates and Oligoethylene Sulfides", The Journal of Organic Chemistry, vol. 26, Issue 12, Dec. 1, 1961, pp. 5111-5115.
U.S. Office Action dated May 6, 2022 in U.S. Appl. No. 16/639,339, 15 pages.
Gennen et al., "$CO_2$-sourced α-Alkylidene Cyclic Carbonates: A Step Forward in the Quest for Functional Regioregular Poly(urethane)s and Poly(carbonate)s.", Angewandte Chemie International Edition 10.1002/anie.201704467, 2017, 7 pages.
U.S. Office Action dated Mar. 28, 2022 in U.S. Appl. No. 16/639,204, 14 pages.
U.S. Appl. No. 16/639,204, filed Feb. 14, 2020, 2020/0239633, Rudolf et al.
U.S. Appl. No. 16/639,339, filed Feb. 14, 2020, 2020/0354333, Rudolf et al.
U.S. Office Action dated Aug. 31, 2022, in U.S. Appl. No. 16/639,339, 14 pages.
U.S. Office Action dated May 31, 2023, in U.S. Appl. No. 16/639,339, 17 pages.

(Continued)

*Primary Examiner* — Randy P Gulakowski
*Assistant Examiner* — Ha S Nguyen
(74) *Attorney, Agent, or Firm* — Grüneberg and Myers PLLC

(57) ABSTRACT

A polymer obtainable by reacting a compound A) comprising at least one five-membered cyclic monothiocarbonate group and at least one polymerizable, ethylenically unsaturated group, a compound B) comprising at least one amino group, selected from primary or secondary amino groups, optionally a compound C) which is different from compound A) and comprises at least one five-membered cyclic monothiocarbonate group, and optionally a compound D) which is different from compound A) and comprises at least one functional group that reacts with a group —SH.

20 Claims, No Drawings

(56) References Cited

OTHER PUBLICATIONS

U.S. Office Action dated Sep. 27, 2023, in U.S. Appl. No. 17/257,749, 21 pages.
U.S. Appl. No. 17/257,749, filed Jan. 4, 2021, 2021/0171811, Licht et al.
U.S. Office Action dated Mar. 12, 2024, in U.S. Appl. No. 17/309,199, 10 pages.
U.S. Appl. No. 17/309,199, filed May 6, 2021, 2021/0395454, Theil et al.

* cited by examiner

POLYMERS OF A COMPOUND COMPRISING A MONOTHIOCARBONATE GROUP AND AN ETHYLENICALLY UNSATURATED GROUP

CROSS-REFERENCE TO RELATED APPLICATIONS

This application is the National Stage entry under § 371 of International Application No. PCT/EP2019/072074, filed on Aug. 19, 2019, and which claims the benefit of European Application No. 18191064.7, filed on Aug. 28, 2018. The content of each of these applications is hereby incorporated by reference in its entirety.

BACKGROUND OF THE INVENTION

Field of the Invention

Object of the invention is a polymer obtainable by reacting
a compound A) comprising at least one five-membered cyclic monothiocarbonate group and at least one polymerizable, ethylenically unsaturated group,
a compound B) comprising at least one amino group, selected from primary or secondary amino groups and optionally
a compound C) which is different from compound A) and comprises at least one five-membered cyclic monothiocarbonate group and
optionally,
a compound D) which is different from compound A) and comprises at least one functional group that reacts with a group —SH.

Description of Related Art

Polyurethanes are important industrial polymers. They have very good mechanical properties and are therefore used in many technical applications. They are used, for example, as or in thermoplastics, foams or coatings. Polyurethanes are usually prepared by reacting compounds with isocyanate groups, notably diisocyanates, with diols. Compounds with isocyanate group are usually highly reactive. Such reactivity leads to increased moisture sensitivity which is problematic in some technical applications. Some compounds with isocyanate groups are considered to be harmful and may cause allergies in case of skin contact or inhalation.

There is a demand to find alternative processes for the manufacturing of polyurethanes thus avoiding the use of compounds with isocyanate groups.

WO 2013/144299 discloses radically polymerizable compounds with a cyclic five membered carbonate ring system (alkylidene-1,3-dioxolan-2-one). Urethane groups are formed by reacting polymers of these compounds with amino compounds. Similar compounds are disclosed in WO 2011/157671 for the use as reactive diluents in epoxy resins. However, the synthesis of such compounds is tedious. Necessary precursors of the synthesis are not commercially available.

From EP-A 1506964 and U.S. Pat. No. 6,372,871 cyclic dithiocarbonates are known. Thiourethane groups (—NH—(C=S)—O) are obtained by reacting cyclic dithiocarbonates with amines. Polythiourethans are not a suitable substitute for polyurethanes.

The object of EP-A 2468791 are epoxy compositions that comprise compounds with five membered cyclic ring system comprising oxygen and sulfur. The compounds used in EP-A 2468791 are dithiocarbonates. J. Org. Chem. 1995, 60, 473 to 475 which is cited in EP-A 2468791, discloses dithiocarbonates, only.

JP2007-178903 discloses polymers which are obtained by radical copolymerization of 5-(methacryloyloxy methyl-1,3-oxathiolane-2-on with other (meth)acrylic monomers. 5-(methacryloyloxy methyl-1,3-oxathiolane-2-on is a compound with at least one monothiocarbonate group and at least one unsaturated group.

D. D. Reynolds, D. L. Fields and D. L. Johnson. Journal of Organic Chemistry, 1961, page 5111 to 5115, disclose compounds with a five-membered cyclic thiocarbonate ring system and reactions thereof. Inter alia a reaction with an amino compound is mentioned.

Unpublished European patent applications with application Ser. No. 17/186,542.1 (INV 170282) and 17186545.4 (INV 170283) relate to a process for the synthesis of compound with at least one monothiocarbonate group.

Unpublished European patent applications with application Ser. No. 17/186,543.9 (INV 170338) and 17186544.7 (INV 170938) relate to polymers which are obtained by reacting compounds with at least one monothiocarbonate group.

SUMMARY OF THE INVENTION

It was an object of this invention to provide an alternative method for the manufacturing of polymers with urethane groups and to avoid the use of compounds with isocyanate groups. Furthermore, it was an object of this invention to provide hybrid polymers that comprise urethane groups. The polymers should be obtainable by an easy and effective manufacturing process which includes moderate temperatures, the lack of condensation by products as, for example, water or alcohol and the absence or at least reduced amount of solvents. The obtained polymers should have satisfying or even improved properties, such properties are, for example, mechanical properties, optical properties, stabilities as UV and corrosion protection. There is also an interest in polymers that have functional groups that easily undergo chemical reactions, thus allowing easy modification or crosslinking of the polymers.

Accordingly, the process described above and polymers obtainable by the process have been found.

DETAILED DESCRIPTION OF THE INVENTION

To compound A)

Compound A) comprises at least one five-membered cyclic monothiocarbonate group and at least one polymerizable, ethylenically unsaturated group.

A five-membered cyclic monothiocarbonate group is a ring system with 5 members, three of them are from the monothiocarbonate —O—C(=O)—S— and the further two members are carbon atoms closing the five-membered cycle.

Compound A) may be a low molecular compound or a polymeric compound and may comprise, for example, up to 1000, notably up to 500, preferably up to 100 five-membered cyclic monothiocarbonate groups and up to 1000, notably up to 500, preferably up to 100 polymerizable, ethylenically unsaturated groups.

In a preferred embodiment, compound A) comprises one to three cyclic monothiocarbonate groups and one to three polymerizable, ethylenically unsaturated groups.

In a most preferred embodiment compound A) comprises one five-membered cyclic monothiocarbonate group and one polymerizable, ethylenically unsaturated group.

Preferred examples of polymerizable, ethylenically unsaturated group are the vinyl group H₂C=CH—, the olefinic group —HC=CH—, wherein the two carbon atoms of the double bond are each substituted by one hydrogen, only, and the further substituents are notably carbon atoms, and the acrylic or methacrylic group, shortly referred to as (meth)acrylic group. In this patent application the term "vinyl group" does not include the (meth)acrylic group.

Particularly preferred ethylenically unsaturated groups are the vinyl group and the (meth)acrylic group.

More preferred ethylenically unsaturated groups are the acrylic or methacrylic group.

The most preferred ethylenically unsaturated group is the methacrylic group.

Preferred compounds A) have a molecular weight of up to 1000 g/mol. Most preferred are compounds C) having a molecular weight of up to 500 g/mol.

In a preferred embodiment, compounds A) do not comprise other functional groups than cyclic monothiocarbonate groups and polymerizable, ethylenically unsaturated groups and, optionally ether groups.

In a more preferred embodiment, compounds A) do not comprise other functional groups than cyclic monothiocarbonate groups and polymerizable, ethylenically unsaturated groups.

Examples for preferred compounds A) are compounds of formula I

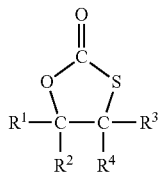

wherein one of R¹ to R⁴ represents an organic group comprising a (meth)acrylic group or a vinyl group and the remaining three of R¹ to R⁴ represent hydrogen or an organic group with at maximum 20 carbon atoms.

Preferably, R¹ to R⁴ represent an organic group with at maximum 20 carbon atoms, more preferably at maximum 10 carbon atoms.

In case of a vinyl group, the organic group does preferably not comprise any other atoms than carbon, hydrogen and oxygen in case of a vinylether group; in case of a (meth)acryl group the organic group does preferably not comprise any other atoms than carbon, hydrogen and the two oxygen atoms of the (meth) acryl group.

In a more preferred embodiment of the invention, R¹ to R⁴ represents an organic group comprising a (meth)acrylic group.

Examples for preferred and more preferred compounds A) are
5-butenyl-1,3-oxathiolane-2-on of formula:

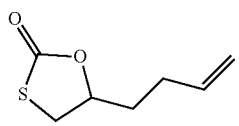

5-ethenyl-1,3-oxathiolane-2-on of formula:

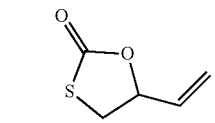

5-(ethenyloxy)methyl-1,3-oxathiolane-2-on of formula

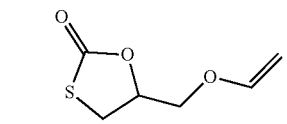

5-(2-propen-1-yloxy)methyl-1,3-oxathiolane-2-on of formula:

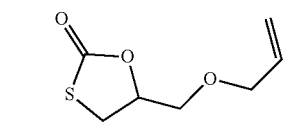

5-(methacryloyloxy)methyl-1,3-oxathiolane-2-on of formula:

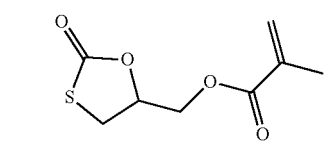

and 5-(acryloyloxy)methyl-1,3-oxathiolane-2-on of formula:

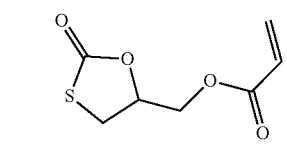

Most preferred are 5-(methacryloyloxy)methyl-1,3-oxathiolane-2-on and 5-(acryloyloxy)methyl-1,3-oxathiolane-2-on.

To compound B)

Compound B) is a compound with at least one amino group, selected from a primary or a secondary amino groups. In this patent application the word amino group shall mean a primary or secondary amino group if not indicated otherwise or obvious from the content otherwise.

Compound B) may have, for example, a molecular weight of up to 500.000 g/mol. The latter might be the case if compound B) is a high molecular compound such as a polymer comprising amino groups.

Preferred compounds B) have a molecular weight of up to 1000 g/mol. Most preferred are compounds B) having a molecular weight of from 60 g/mol to 500 g/mol.

In a preferred embodiment compounds B) do not comprise any monothiocarbonate groups and do not comprise any functional groups which react with the group —SH as listed for compound D).

In a particularly preferred embodiment compounds B) do not comprise other functional groups than primary or secondary amino groups, carboxylic ester groups or ether groups.

In a preferred embodiment compounds B) comprise 1 to 10 amino groups, preferably 1 or 5 amino groups and, in a most preferred embodiment compound B) comprises 1 to 5 amino groups.

In a preferred embodiment, at least one of the amino groups is a primary amino group.

In a particularly preferred embodiment at least two of the amino groups are primary amino groups.

In a most preferred embodiment all amino groups of compound B) are primary amino groups.

Compounds B) with one amino group are, for example, monoalkylamines with a primary amino group such as C1 to C20 alkylamines or cycloalkyl amines or etheramines such as 2-methoxyethylamine or 3-methoxypropylamine or di- or polyether amines such as di- or polyglycol amine, polyoxypropylene amine.

Compounds B) with more than one amino group are, for example,
- alkylendiamines or alkylenpolyamines such as ethylenediamine, propylenediamine, butylene diamine, pentamethylene diamine, hexamethylene diamine, neopentanediamine, octamethylendiamine, 1,3 diaminopentane, 2-Methylpentan-1,5-diamin
- alkylendiamines or alkylenpolyamines comprising ether groups (polyetheramine) such as such polyglycoldiamine, oxypropylene diamine or polyoxypropylene diamine.
- cycloaliphatic diamines, such as cyclohexyldiamines, for example 1,2 diaminocyclohexane, 1-methyl-2,4-diaminocyclohexane, 1-methyl-2,6-diaminocyclohexane or mixtures thereof, isophorone diamine, bis(4-aminocyclohexyl)methane, 1,3-bis(aminomethyl)cyclohexane, 1,4-bis(aminomethyl)cyclohexane, 2,5-bisaminomethyl tetrahydrofuran, 3,3-Dimethyl-4,4 diaminodicyclohexylmethane and
- aromatic diamines such as 1,2-phenylendiamine or 1,4 phenylendiamine, toluene diamines, 4,4' diamino-diphenylmethane, 4,4' diaminodiphenylsulfone, 2,5-bisaminomethyl furan, Compounds B may also be used in a form wherein the amino groups are protected with a protecting group. As soon as it become necessary or desired the protecting group is removed so that the compounds B) above with free amino groups are obtained. Usually, removal of the protecting groups occurs under the conditions of the reaction. Usual protected amino groups for amino groups are, for example, ketamine, aldimine, imidazolidine, oxazolidine, lewis acid complexed amines, carbamates, benzyloxycarbonyl amines, acyloximes, formanilidine. The deprotecting reaction can, for example, be triggered by either temperature, light, pH or presence of water/humidity.

Further suitable compounds B) are, for example, listed in unpublished European patent applications with application Ser. No. 17/186,543.9 (INV 170338) and 17186544.7 (INV 170938).

To Compound C)

Compounds C) are compounds that are different from compounds A) but comprise also at least one five-membered cyclic monothiocarbonate group.

Compounds C) may comprise, for example, up to 1000, in particular up to 500, preferably up to 100 five-membered cyclic monothiocarbonate groups.

In a preferred embodiment, compounds C) comprise 1 to 10, notably 1 to 5 five-membered cyclic monothiocarbonate groups. In a most preferred embodiment compound C) comprises 1 or 3, notably 1 or 2 five-membered cyclic monothiocarbonate groups.

Compounds C) may have, for example, a molecular weight of up to 500.000 g/mol. The latter might be the case if the compound C) is a high molecular compound.

In a preferred embodiment, compounds C) comprise one to three cyclic monothiocarbonate groups.

Compounds C) may have, for example, a molecular weight of up to 500.000 g/mol. The latter might be the case if compound A) is a high molecular compound.

Preferred compounds C) have a molecular weight of up to 1000 g/mol. Most preferred are compounds C) having a molecular weight of up to 500 g/mol.

In a preferred embodiment, compounds C) do not comprise any primary or secondary amino groups and do not comprise any functional groups which react with the group —SH as listed for compound D).

In a particularly preferred embodiment compounds C) do not comprise other functional groups than monothiocarbonate groups, carboxylic ester groups or ether groups.

Preferred compounds C) with one five-membered cyclic monothiocarbonate group are compounds of formula II

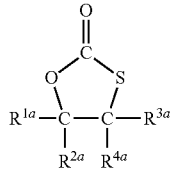

with $R^{1a}$ to $R^{4a}$ independently from each other representing hydrogen or an organic group with up to 50 carbon atoms whereby, alternatively, $R^{2a}$, $R^{4a}$ and the two carbon atoms of the thiocarbonate group may also together form a five to ten membered carbon ring In case that any of $R^{1a}$ to $R^{4a}$ represent an organic group, such organic group is preferably an organic group with up to 30, more preferably up to 20 carbon atoms carbon atoms. In a further preferred embodiment $R^{2a}$ and $R^{4a}$ do not form a five to ten membered carbon ring together with the two carbon atoms of the thiocarbonate group.

In case that any of $R^{1a}$ to $R^{4a}$ represent an organic group, such organic group may comprise heteroatoms and functional groups as listed above. In particular, it may comprise oxygen, nitrogen, sulfur, silicon and chloride. In a preferred embodiment, the organic group may comprise oxygen or chloride. $R^{1a}$ to $R^{4a}$ may comprise oxygen for example in form of ether, hydroxy, aldehyde, keto or carboxy groups. In a preferred embodiment, the organic group is an aliphatic organic group with up to 30 carbon atoms which may comprise oxygen, nitrogen or chloride, in particular oxygen.

In a more preferred embodiment, the organic group is selected from an alkyl group, from a group —$CH_2$—O—$R^{5a}$ or a group —$CH_2$—O—C(=O)—$R^{6a}$ or a group —$CH_2$—$NR^{7a}R^{8a}$ with $R^{5a}$ to $R^{8a}$ being an organic group with up to 30 carbon atoms, preferably up to 20 carbon atoms. In particular, $R^{5a}$ to $R^{8a}$ represent an aliphatic or aromatic group, which may comprise oxygen, for example in form of ether groups. In a preferred embodiment, $R^{5a}$ to $R^{8a}$ represent an aliphatic hydrocarbon group, such as an alkyl group with 1 to 10 carbon atoms, an alkoxy group or a poly-alkoxy group. In a most preferred embodiment, $R^{5a}$ to $R^{8a}$ represent an aliphatic hydrocarbon group, notably an alkyl group with 1 to 10 carbon atoms.

In a most preferred embodiment, the organic group is a group —$CH_2$—O—$R^{5a}$ or a group —$CH_2$—O—C(=O)—$R^{6a}$.

Preferably, two to all four of $R^{1a}$ to $R^{4a}$ in formula II represent hydrogen and the remaining groups $R^{1a}$ to $R^{4a}$ represent an organic group.

More preferably, two and or three of $R^{1a}$ to $R^{4a}$ in formula II represent hydrogen and the remaining groups $R^{1a}$ to $R^{4a}$ represent an organic group.

Most preferably, three of $R^{1a}$ to $R^{4a}$ in formula II represent hydrogen and the remaining group of $R^1$ to $R^4$ represents an organic group. In a preferred embodiment $R^{1a}$ or $R^{2a}$ is the remaining group representing an organic group.

As preferred compounds C) with one five-membered monothiocarbonate group may be mentioned:

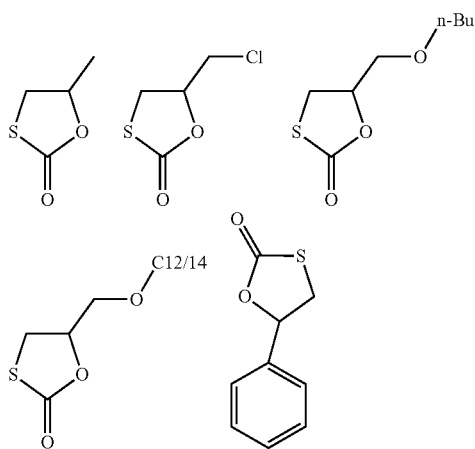

Preferred compounds C) with more than one five-membered cyclic monothiocarbonate group are compounds of formula III

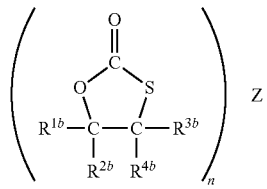

with $R^{1b}$ to $R^{4b}$ independently from each other representing hydrogen or an organic group with up to 50 carbon atoms whereby, alternatively, $R^{2b}$, $R^{4b}$ and the two carbon atoms of the monothiocarbonate group may also together form a five to ten membered carbon ring, and with one of the groups $R^{1b}$ to $R^{4b}$ being a linking group to Z, n representing an integral number of at least 2 and Z representing a n-valent organic group.

In case that any of $R^{1b}$ to $R^{4b}$ represent an organic group, such organic group is preferably an organic group with up to 30 carbon atoms. In a further preferred embodiment $R^{2b}$ and $R^{4b}$ do not form a five to ten membered carbon ring together with the two carbon atoms of the epoxy group.

In case that any of $R^{1b}$ to $R^{4b}$ represent an organic group, such organic group may comprise other elements than carbon and hydrogen. In particular, it may comprise oxygen, nitrogen, sulfur and chloride. In a preferred embodiment, the organic group may comprise oxygen or chloride. $R^{1b}$ to $R^{4b}$ may comprise oxygen for example in form of ether, hydroxy, aldehyde, keto or carboxy groups.

One of the groups $R^{1b}$ to $R^{4b}$ is the linking group to Z.

Preferably, the linking group is simply a bond or a group $CH_2$—O— or $CH_2$—O—C(=O)— or $CH_2$—$NR^{5b}$— with $R^{5b}$ being an aliphatic group, in particular an alkyl group with at maximum 20 carbon atoms.

More preferably, the linking group is simply a bond or a group $CH_2$—O— or a group $CH_2$—O—C(=O)—.

In a most preferred embodiment, the linking group is a group $CH_2$—O—.

Preferably, two or three of the groups $R^{1b}$ to $R^{4b}$ in formula I are hydrogen.

In a most preferred embodiment three of the groups $R^{1b}$ to $R^{4b}$ represent hydrogen and the remaining group of $R^{1b}$ to $R^{4b}$ is the linking group to Z.

In a most preferred embodiment groups $R^{1b}$ or $R^{2b}$ is the linking group to Z.

n represents an integral number of at least 2. For example, n may be an integral number from 2 to 1000, specifically from 2 to 100 respectively 2 to 10.

In a preferred embodiment n is an integral number from 2 to 5, in particular n is 2 or 3.

In a most preferred embodiment n is 2.

Z represents a n-valent organic group. In case of high number of n, such as, for example, 10 to 1000, Z may be a polymeric group, in particular a polymer-backbone, obtained, for example by polymerization or copolymerization, such as radical polymerization of ethylenically unsaturated momomers, polycondensation or polyaddition. For example, polyesters or polyamides are obtained via polycondensation under eliminiation of water or alcohol and polyurethanes or polyureas are obtained via polyaddition.

Such compounds of formula III are, for example, polymers obtained by radical polymerization or copolymerization of ethylenically unsaturated momomers comprising monothiocarbonate groups or of monomers comprising epoxy groups which are then transferred into a monothiocarbonate group.

In a preferred embodiment Z is a n-valent organic group with up to 50 carbon atoms, in particular up to 30 carbon atoms, and which may comprise other elements than carbon and hydrogen and n is an integral number from 2 to 5, notably 2 or 3, most preferred 2.

In a particularly preferred embodiment Z is a n-valent organic group with up to 50 carbon atoms, in particular up to 30 carbon atoms, and which comprises carbon, hydrogen and optionally oxygen, only and no further elements and n is an integral number from 2 to 5, notably 2 or 3, most preferred 2.

In a preferred embodiment Z is a polyalkoxylene group of formula G1

(V—O—)$_m$V wherein V represents a C2- to C20 alkylen group and m is an integral number of at least 1. The terminal alkylene groups V are bonded to the linking group, which is one of the groups $R^{1b}$ to $R^{4b}$, see above.

Preferably, the C2-C20 alkylen group is a C2- to C4 alkylen group, in particular ethylene or propylene. m may, for example, be an integral number from 1 to 100, in particular from 1 to 50.

In a further preferred embodiment Z is a group of formula G2

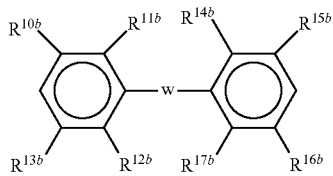

wherein W is a bi-valent organic group with at maximum 10 carbon atoms and n is 2 and $R^{10b}$ to $R^{17b}$ independently from each other represent H or a C1- to C4 alkyl group and wherein the two hydrogen atoms in the para position to W are replaced by the bond to the linking group, which is one of the groups $R^{1b}$ to $R^{4b}$, see above.

Preferably, at least six of $R^{10b}$ to $R^{17b}$ are hydrogen. In a most preferred embodiment all of $R^{10b}$ to $R^{17b}$ are hydrogen.

Groups W are, for example:

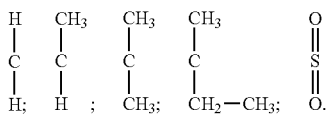

Preferably, W is an organic group that consists of carbon and hydrogen, only.

Most preferred W is

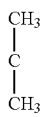

which corresponds to the structure of bisphenol A.

In a further preferred embodiment Z is a group G3, wherein G3 represents an alkylene group, notably a C2 to C8 alkylene group; preferred examples of such an alkylene group are ethylene ($CH_2$—$CH_2$), n-propylen ($CH_2$—$CH_2$—$CH_2$) and notably n-butylene ($CH_2$—$CH_2$—$CH_2$—$CH_2$).

Examples for preferred compounds with at least two five-membered cyclic monothiocarbonate groups are in particular those compounds which are obtained by transferring all epoxy groups of the following epoxy compounds into five-membered cyclic monothiocarbonate groups:

Non-glycidyl epoxides:
1,2:5,6-diepoxyhexahydro-4,7-methanoindan, bis (3,4-epoxycyclohexylmethyl) adipate, 1,4-cyclohexanedimethanol bis(3,4-epoxycyclohexanecarboxylate, 1-methyl-4-(2-methyloxiranyl)-7-oxabicyclo[4.1.0]heptane, 4-vinylcyclohexene dioxide, 1,2,5,6-diepoxycyclooctane, 1,2,7,8-diepoxyoctane, dicyclopentadiene dioxide, epoxidized plant oils or derivatives thereof, for example soy bean oil or derivatives thereof.

Glycidylether:
Bisphenol A diglycidylether (BADGE), hydrogenated BADGE, glycidylether of other di-, tri, tetra- and polyols such as butandiol-diglycidylether, trimethylolpropan-triglycidylether, pentaerythritol tetraglycidyl ether, sorbitolpolyglycidylether, isosorbiddiglycidylether, methylphenlypropandioldiglycidylether. This includes also oligomeric/polymeric glycidylether such as e.g. polypropylenglycoldiglycidylether, polyglycerolpolyglycidylether, novolac-glycidylether, oligomers or polymers obtained by reacting bisphenol A with an excess of epichlorhydrin.

Glycidylester:
Tetrahydrophthalic acid diglycidyl ester, Diglycidyl 1,2-cyclohexanedicarboxylate, Diglycidylorthophthalate Glycidyl amine:
N,N-Diglycidyl-4-glycidyloxyaniline, Tetraglycidylmethylenedianiline Glycidylimide:
triglycidyl isocyanurate To the synthesis of compounds with at least one five-membered monothiocarbonate group (compounds A and C)

Some methods for the synthesis of compounds with one monothiocarbonate group are described in the state of the art.

According to U.S. Pat. Nos. 3,072,676 and 3,201,416 ethylene monothiocarbonates may be prepared by a two-step-process. In a first step mercaptoethanol and chloro carboxylates are reacted to give hydroxyethylthiocarbonate, which is heated in the second step in a presence of metal salt catalyst to the ethylene monothiocarbonate.

According U.S. Pat. No. 3,517,029 alkylene monothiocarbonates are obtained by reacting mercaptoethanol and a carbonate diester in the presence of a catalytically active salt of thorium.

According to the process disclosed in U.S. Pat. No. 3,349,100 alkylene monothiocarbonates are obtained by reacting an epoxide with carbonylsulfide. The availability of carbonylsulfide is limited. Yields and selectivities of alkylene monothiocarbonates obtained are low. M.

A synthesis using phosgene as starting material is known from U.S. Pat. No. 2,828,318. Phosgene is reacted with hydroxymercaptanes. Yields of monothiocarbonates are still low and by products from polymerization are observed.

A preferred process for the preparation of compounds A) and C), is a process wherein
a) a compound with at least one epoxy groups (shortly referred to as epoxy compound) is used as starting material
b) the compound is reacted with phosgene or an alkyl chloroformate thus giving an adduct and
c) the adduct is reacted with a compound comprising anionic sulfur to give the compound with at least one five-membered cyclic monothiocarbonate groups This process is in detail described in unpublished European patent application with application number 17186545.4 (INV 170283).

To compound D)

Compounds D) comprises at least one functional group that reacts with a group —SH.

Compounds D) do not comprise five-membered cyclic monothiocarbonate groups.

Preferably, compounds D) do not comprise amino groups selected from primary or secondary amino groups.

In a particularly preferred embodiment, compounds C) do not comprise other functional groups than functional groups selected from the functional groups which react with the group —SH or from carboxylic ester groups or ether groups.

Compounds D) may have, for example, a molecular weight of up to 500.000 g/mol. The latter might be the case if compound D) is a high molecular compound such as a polymer comprising functional groups that react with a group —SH.

Preferred compounds D) have a molecular weight of up to 1000 g/mol. Most preferred are compounds D) having a molecular weight of from 60 g/mol to 500 g/mol.

Compounds D) may have, for example, up to 1000 functional groups that react with a group —SH, in particular up 500 and preferably up to 100 functional groups that react with a group —SH.

In a preferred embodiment compound D) comprises 1 to 10 functional groups that react with a group —SH.

In a most preferred embodiment compound D) comprises 1 to 3, notably 1 or 2 functional groups that react with a group —SH.

In a preferred embodiment, the reaction of the functional group of compound D) with the group —SH results in the formation of a sulfur-carbon bond.

The reaction of the functional groups of D) with the group —SH may be an addition reaction, a condensation reaction or a nucleophilic substitution reaction.

Examples for compounds D) which functional groups that undergo an addition reaction, a condensation reaction or a nucleophilic substitution reaction with the group —SH are listed in unpublished European patent applications with application Ser. No. 17/186,543.9 (INV 170338) and 17186544.7 (INV 170938).

Preferred are compounds D) with at least one functional group, that undergoes an addition reaction with the group —SH are, for example, polymerizable, ethylenically unsaturated groups, epoxy groups or isocyanate groups.

Preferably, the functional groups of compound D) are selected from polymerizable, ethylenically unsaturated groups or epoxy groups.

To compounds D) with ethylenically unsaturated groups as functional groups.

Compounds D) with one ethylenically unsaturated group are, for example, (meth)acrylic acid, (meth)acrylic esters, vinylesters, for example vinyl acetate, vinyl ethers, vinyl lactames, for example N-vinyl pyrrolidone, vinyl aromatics as styrene, vinyl halogenids as vinyl chloride or vinyl fluoride or olefines with one carbon-carbon double bond, such as ethylene, propylene.

Compounds with more than one ethylenically unsaturated group are, for example, compounds with at least two (meth) acrylic groups, at least two vinyl groups or olefines with at least two carbon-carbon double bonds, unsaturated polyesters.

Olefins with two carbon-carbon double bonds are, for example, butadiene, cyclooctadiene, cyclododecatriene, isoprene, limonene, divinyl cyclohexane or poybutadiene or polyisoprene.

Oligomers with at least two acrylic or methacrylic groups are in particular (meth)acrylic esters of polyfunctional alcohols or of alkoxylated polyfunctional alcohols.

(Meth)acrylic esters of polyesterols may also be mentioned as oligomers.

Epoxide (meth)acrylates or urethane (meth)acrylates may also be suitable oligomers.

Oligomers with at least two vinyl groups are, for example divinylether such as diethylenglycol- or triethylenglycol-divinylether.

Compounds with more than one ethylenically unsaturated group may also be unsaturated polyesters, notably polyesters of maleic acid, fumaric acid, citraconic acid or itaconic acid.

In a preferred embodiment, compounds D) with ethylenically unsaturated groups as —SH reactive group are (meth) acrylic compounds, in particular (meth)acrylates of polyfunctional alcohols, or compounds with vinyl ether groups or unsaturated polyester. In a particularly preferred embodiment compounds D) with ethylenically unsaturated groups as —SH reactive groups are (meth)acrylic compounds.

To compounds D) with epoxy groups as functional groups

Compounds D) with at least one epoxy group are for example, compounds obtained by reacting compounds with at least one alcohol groups with epichlorohydrin.

Compounds D) with one epoxy group are, for example, epichlorohydrin or derivatives thereof wherein the chloride of epichlorohydrin is replaced by a hydroxy group (glycidol) ether group (glycidyl ether), ester group (glycidyl ester) or amino group (glycidyl amine).

Examples of compound D) with at least two epoxy groups which may be mentioned are the diglycidyl ethers of bisphenol A or bisphenol F or bisphenol S and the diglycidylethers of hydrogenated bisphenol A or bisphenol F or diglycidylethers of aliphatic diols such as diglycidylethers of polyalkoxylene diols. Mentioned may be also oligoglycidylether based on oligoalcohols. Examples are also epoxy resins which are obtainable by using the compounds with at least two alcohol groups in excess compared to the epichlorohydrin. In such epoxy resins the degree of polymerization of the compound with at least two alcohol groups is preferably from 2 to 25, in particular from 2 to 10.

Further examples are epoxidized fatty acid, fatty acid ester or fatty acid alcohol which have at least two epoxy groups.

To the Synthesis of the Polymer

The principles of the reaction of A) with B) are in the following described for a compound A) with one cyclic monothiocarbonate groups and one polymerizable, ethylenically unsaturated group and a compound B) with one amino group.

The cyclic monothiocarbonate group of A) is opened by reacting with the amino group of compound B). The obtained adduct of this addition reaction is a compound comprising one group —SH and one polymerizable, ethylenically unsaturated group.

The group —SH undergoes an addition reaction with the polymerizable, ethylenically unsaturated group resulting in a head to tail polyaddition.

The ring opening followed by polyaddition is exemplarily shown below for a specific compound A) and B):

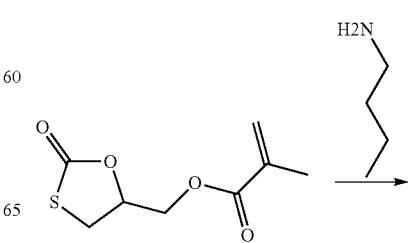

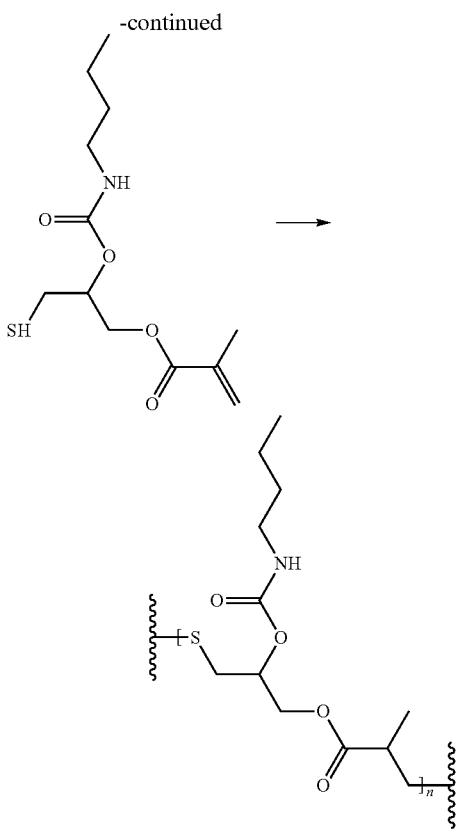

The monothiocarbonate ring of 5-(methacryloyloxy) methyl-1,3-oxathiolane-2-on is opened by reaction with butylamine at room temperature to give the adduct. The adduct is an insitu intermediate which directly polymerizes as described above.

In the above example a polymer is formed which has urethane groups.

The principles of the reaction are further described for a compound A) with two cyclic monothiocarbonate groups and one polymerizable, ethylenically unsaturated group. In this case, the amount of compound B) would preferably be chosen to give an equimolar amount of cyclic monothiocarbonate groups and amino groups so that the ring of all cyclic monothiocarbonate groups is opened. The result is a compound with two —SH groups and only one polymerizable, ethylenically unsaturated group.

In the subsequent polyaddition only one —SH group is consumed in the head to tail polyaddition, as described above. One —SH group remains and can be reacted with a compound D) finally giving a polymer of A), B) and D).

A molar excess of —SH groups can also be achieved by adding a compound C) to the reaction composition, in other words "by using a compound C) as comonomer. In this case, the amount of compound B) would again be preferably chosen to give an equimolar amount of monothiocarbonate groups and amino groups. To react the remaining —SH groups, the addition of a compound D) is required, finally giving a polymer of A), B), C) and D).

Without the addition of compound D), the —SH groups may oxidize and will form disulfide bridges. Such oxidation may occur at room temperature in the presence of oxygen. Disulfide bridges may improve mechanical properties of the polymers obtained.

The obtained polymer comprises as structural element a urethane group with a sulfur atom being bonded via an ethylene group to the oxygen of the urethane group. This structural element can be represented by the following formula:

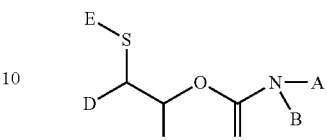

The variables A to E represent any possible substitutions by substituents.

The polymerization of A) and B) is a simple one step reaction.

The polymerization of A), B), C) and D) may be carried out in one step or two steps.

A one-step reaction means that all compounds A), B), C) and D) are reacted simultaneously. In this case the amino groups of B) may react with the cyclic monothiocarbonate group of compound C) (ring-opening) or may react with functional groups of compound D), if the reactivity of the amino groups with the functional groups of D) is high enough to compete with the ring-opening reaction.

A two-step reaction means that A), C) and B) are reacted first and the adduct formed is then reacted with D).

Hence, the two-step reaction results in defined polymers, whereas the one-step reaction may result in less defined hybrid systems, if the reactivity of the amino groups with the functional groups of D) is high enough.

For example, epoxy groups have high reactivity with amino groups. Hence the use of compounds D) with epoxy groups will result in hybrid systems. Methacrylic groups are considered to have low reactivity with amino groups. Hence the use of compounds D) with methacrylic groups will result in the essentially same or similar polymer, regardless whether a one-step reaction or of a two-step reaction has been performed.

Preferably, the polymer consists to at least 40%, notably to at least 60% by weight of compounds A) and B).

More preferably, the polymer consists to at least 80%, notably to at least 90% by weight of compounds A) and B).

Most preferably, compounds C) and/or D) are used in minor amounts, only, or are not used at all; hence the polymer consists most preferably to at least 95%, respectively to at least 98% and particularly to 100% by weight of compounds A) and B).

In the synthesis of the polymer, compounds B) are preferably used in an amount to transfer at least 10 mol %, more preferably at least 50 mol % and most preferably at least 90 mol % of the cyclic monothiocarbonate groups of compounds A) and optionally C) into —SH groups. In a particularly preferred embodiment, compounds B) are used in an amount to transfer 100 mol % of the cyclic monothiocarbonate groups of compounds A) and optionally C) into —SH groups.

In one embodiment, a polymer may be desired that has a content of polymerizable, ethylenically unsaturated groups of compound A). Such remaining polymerizable, ethylenically unsaturated groups of compound A) could be used, for example, for later crosslinking reactions. In this case, compounds B) are preferably used in an amount to transfer at maximum 99 mol %, or at maximum 70 or 50 mol % of the cyclic monothiocarbonate groups of compounds A) into —SH groups; the amount of —SH groups obtained is not sufficient to react with all the polymerizable, ethylenically unsaturated groups of compound A) thus leaving the desired amount of polymerizable, ethylenically unsaturated groups of compound A) unreacted and available for later cross-linking.

Preferably, compounds A), B) and optionally C) and D) are used in an amount to give a molar ratio of 0.8 to 1.2 mol of groups reactive with —SH to 1 mol of —SH groups. More preferably, compounds A), B) and optionally C) and D) are used in an amount to give a molar ratio of 0.95 to 1.05 mol of groups reactive with —SH to 1 mol of —SH groups. Most preferably, compounds A), B) and optionally C) and D) are used in an amount to give a molar ratio of 1 mol of groups reactive with —SH to 1 mol of —SH groups; this is automatically the case if compounds A) and B) are used, only, and the amount of B) is sufficient to open all cyclic monothiocarbonate groups of A).

Preferably, the reaction of A), B) and optionally C) and D) may be performed at temperatures of from −20 to 250° C., preferably between 20 and 100° C. This applies to the one-step reaction and to both steps of the two-step reaction. Alternatively, any activation energy for the reactions may be provided by high-energy radiation such as visible or UV-light.

Catalysts may be used to support the polymerization of compound A), B) and optionally C) and D), for example in case of compounds D) that add via an addition reaction to the groups —SH. Addition reactions may follow an ionic or a radical mechanism. The ionic mechanism usually requires the presence of a basic compound as catalyst. The basic catalyst may be compound B) itself. In case of compounds D) with polymerizable, ethylenically unsaturated groups the presence of compound B) is often sufficient. In case of epoxy groups as functional groups a basic catalyst such as a tertiary amine, for example Versamin® may be used preferably. Such catalysts are usually used in an amount of 0.1 to 3 mol, preferably 0.1 to 1 mol catalyst per one mol of epoxy groups. Other catalysts may be amidine or guanidine-based systems or phosphines A radical mechanism of the addition reaction is supported by initiators that form radicals. Such initiators are either thermal, redox, electrochemical or photoactive initiators well known from radical polymerization.

The one-step or two-step reaction may be performed with solvent. The use of a solvent might be helpful, in case that at least one of the compounds A), B) and C) is solid and other liquid compounds A), B), C) or D) do not act already as solvent for the solid compound. Suitable solvents are, for example, ethylacetate, butylacetate, methyl ethyl ketone, dioxane, methanol, ethanol, water, tetrahydrofuran and dimethylformamide. It is an advantage of the process that usually no additional solvent is required as usually at least one of the compounds A), B) and optionally C) and D) may be liquid and may serve already as solvent.

In case that both, compound A) and compound B) and any further compound C) and D) are solid, notably at 21° C., a solvent-free powder mixture of compounds A) and B) may be prepared and stored. Reaction occurs by heating the powder mixture above the melting pound of the compounds.

Before the reaction, compounds A), B) and optionally C) and D) may be kept and stored in form of a two-component curable system, known as 2K-systems. Such 2K systems comprise two components that are stored separately and mixed shortly before the application thereof. In a preferred embodiment, the two components of the 2K system are liquid at 21° C.

The first component of the 2K-system comprises all compounds with monothiocarbonate groups and the second component comprises all compounds with primary or secondary amino groups.

Hence, the first component comprises compound A) and optionally C) and the second component comprises compound B).

Preferably, compound D) forms also part of the first component, as compound D) may have high reactivity or at least some reactivity with amino groups.

Hence, in a preferred embodiment of the invention, the 2K-system comprises a first component comprising compound A) and optionally C) and D) and a second component comprising compound B).

Before the reaction, compounds A), B) and optionally C) and D) may be kept and stored also in form of one-component curable system, comprising all compounds A), B), C) and D), known as 1K-systems. However, such 1K system requires that the amino groups of compound B) are blocked with a blocking agent. The blocked amino group decomposes into the free amino group and the blocking agent at higher temperatures (deblocking temperature). Hence such 1K systems should be applied at temperatures above the deblocking temperature.

Furthermore, the above described 2K system may comprise further additives, for example catalysts or inhibitors or additives that support the polymerization or are required or desired for the intended use of the polymer obtained. The additives may form part either of the first component or the second component or of both components of the 2K-system.

Such additives may be catalysts (see above) or stabilizers.

In particular, redox stabilizers that reduce or avoid oxidation of S—H groups which is a side reaction may be added. Oxidation of S—H groups may lead to disulfide bridges between neighbored molecules thus reducing the amount of S—H groups available for the reaction with compound C. Examples of such stabilizers are trialkylphosphines or triarylphosphines.

Alternatively, any additives or stabilizers may also be added after the reaction to the polymer obtained.

The obtained polymers are usually transparent, non-tacky and solid at room temperature.

The process of this invention provides an alternative method for the manufacturing of polymers with urethane groups. In this process the use of compounds with isocyanate groups is avoided. The process of this invention is an easy and effective manufacturing process, notably a process not requiring high energy or high temperatures. Solid and transparent polymers are easily available and are useful for a variety of technical applications such as coatings, adhesives, thermoplastic or duroplastic material for the formation of molds in any form. Hybrid polymers are available with modified properties due to the introduction of urethane groups in polymers such as epoxy resins. Optical polymers with high refractive index are accessible. Polymers obtained show high thermal stability. The process furthermore offers a curing mechanism for low temperature curing which is compatible with the presence of oxygen.

EXAMPLES

Example 1

Polymer of compound A) with one methacryl group and compound B) with one amino group In a 10 ml flask fitted with a magnetic stirrer 5-(methacryloyloxy)methyl-1,3-oxathiolane-2-on (1,01 g) were melted. Butylamine (0,37 g) was added at 40° C. under stirring. Viscosity of the mixture increased over time. The polymer was still viscous after 24 h.

Example 2

Polymer of compound A) with one methacryl group and compound B) with two amino groups in presence of solvent In a 50 ml flask fitted with a magnetic stirrer 1,4 dioxane (0,75 g) and 5-(methacryloyloxy)methyl-1,3-oxathiolane-2-on (2,02 g) were stirred and heated to 50° C. until homogenous solution was obtained. The solution was cooled to 25° C. Subsequently, 1,3 diaminocyclohexane (0,71 g) was added under stirring. The polymer solidified within 30 minutes at room temperature, tack-free polymer was obtained after 2 h.

Example 3

Polymer of compound A) with one methacryl group and compound B) with three amino groups in presence of solvent In a 50 ml flask fitted with a magnetic stirrer 1,4 dioxane (1,5 g) and 5-(methacryloyloxy)methyl-1,3-oxathiolane-2-on (3,03 g) were stirred and heated to 50° C. until homogenous solution was obtained. The solution was cooled to 30° C. Subsequently, tris(2-aminoethyl)amine (0,74 g) was added under stirring. The polymer solidified within 4 minutes.

Example 4

Polymer of compound A) with one methacryl group and compound B) with three amino groups without solvent In a 50 ml flask fitted with a magnetic stirrer 5-(methacryloyloxy)methyl-1,3-oxathiolane-2-on (3,03 g) was heated and subsequently cooled to 40° C. To the melt was added tris(2-aminoethyl)amine (0,74 g). The reaction mixture solidified within seconds under rapid increase of temperature.

The invention claimed is:

1. A polymer, obtained by reacting:
   a compound A) comprising one to three five-membered cyclic monothiocarbonate groups and at least one polymerizable, ethylenically unsaturated group,
   a compound B) comprising at least one amino group, selected from the group consisting of primary and secondary amino groups,
   optionally, a compound C) which is different from compound A) and comprises at least one five-membered cyclic monothiocarbonate group, and
   optionally, a compound D) which is different from compound A) and comprises at least one functional group that reacts with a group —SH wherein the five-membered cyclic monothiocarbonate group of compound A) is opened by the reaction with the amino groups of compound B) to form an adduct comprising a SH group and a polymerizable, ethylenically unsaturated group, followed by a reaction of the SH group with the polymerizable, ethylenically unsaturated group.

2. The polymer according to claim 1, wherein compound A) comprises one five-membered cyclic monothiocarbonate group and one polymerizable, ethylenically unsaturated group.

3. The polymer according to claim 1, wherein the polymerizable, ethylenically unsaturated group is a vinyl group or an acrylic or methacrylic group.

4. The polymer according to claim 1, wherein compound A) is a compound of formula I

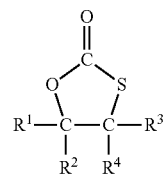

wherein one of $R^1$ to $R^4$ represents an organic group comprising a vinyl group or a (meth)acrylic group and the remaining three of $R^1$ to $R^4$ represent hydrogen or an organic group with at maximum 20 carbon atoms.

5. The polymer according to claim 1, wherein compound A) is 5-(methacryloyloxy)methyl-1,3-oxathiolane-2-on or 5-(acryloyloxy)methyl-1,3-oxathiolane-2-on.

6. The polymer according to claim 1, wherein compound B) comprises one to five amino groups.

7. The polymer according to claim 1, wherein compound D) is present, wherein the functional group of compound D) that reacts with —SH is selected from the group consisting of polymerizable, ethylenically unsaturated groups and epoxy groups.

8. The polymer according to claim 1, wherein the polymer comprises at least 60% by weight of compounds A) and B).

9. The polymer according to claim 1, wherein compounds A), B) and optionally C) and D) are used in an amount to give a molar ratio of 0.8 to 1.2 mol of groups reactive with —SH to 1 mol of —SH groups.

10. A two component curable system, consisting of:
   a first component comprising a compound A) comprising one to three five-membered cyclic monothiocarbonate groups and at least one polymerizable, ethylenically unsaturated group,
   optionally, a compound C) which is different from compound A) and comprises at least one five-membered cyclic monothiocarbonate group, and
   optionally, a compound D) which is different from compound A) and comprises at least one functional group that reacts with a group —SH, and
   a second component comprising a compound B) comprising at least one amino group, selected from the group consisting of primary and secondary amino groups wherein when compound A) and compound B) are combined, the five-membered cyclic monothiocarbonate group of compound A) is opened by the reaction with the amino groups of compound B) to form an adduct comprising a SH group and a polymerizable, ethylenically unsaturated group, followed by a reaction of the SH group with the polymerizable, ethylenically unsaturated group.

11. A process for the manufacturing of a polymer, the process comprising:

reacting a compound A) comprising one to three five-membered cyclic monothiocarbonate groups and at least one polymerizable, ethylenically unsaturated group, a compound B) comprising at least one amino group, selected from the group consisting of primary and secondary amino groups, optionally, a compound C) which is different from compound A) and comprises at least one five-membered cyclic monothiocarbonate group, and optionally, a compound D) which is different from compound A) and comprises at least one functional group that reacts with a group —SH, wherein compound B) is used in an amount to transfer at least 10 mol % of the monothiocarbonate groups of compounds A) and optionally C) into —SH group, and wherein the five-membered cyclic monothiocarbonate group of compound A) is opened by the reaction with the amino groups of compound B) to form an adduct comprising a SH group and a polymerizable, ethylenically unsaturated group, followed by a reaction of the SH group with the polymerizable, ethylenically unsaturated group.

12. The polymer according to claim 1, wherein compound A) comprises 1 to 3 cyclic monothiocarbonate groups and 1 to 3 polymerizable, ethylenically unsaturated groups.

13. The two-component curable system according to claim 10, wherein compound A) comprises 1 to 3 cyclic monothiocarbonate groups and 1 to 3 polymerizable, ethylenically unsaturated groups.

14. The process according to claim 11, wherein compound A) comprises 1 to 3 cyclic monothiocarbonate groups and 1 to 3 polymerizable, ethylenically unsaturated groups.

15. The two-component curable system according to claim 10, wherein compound B) is used in an amount to transfer at least 10 mol % of the monothiocarbonate groups of compounds A) and optionally C) into —SH groups.

16. The polymer according to claim 1, wherein compound C) is present.

17. The polymer according to claim 1, wherein compound D) is present.

18. The two-component curable system according to claim 10, wherein compound C) is present.

19. The two-component curable system according to claim 10, wherein compound D) is present.

20. The polymer according to claim 1, wherein compound B) is used in an amount to transfer at least 10 mol % of the monothiocarbonate groups of compounds A) and optionally C) into —SH groups.

* * * * *